(12) United States Patent  
Boman

(10) Patent No.: US 8,708,647 B2
(45) Date of Patent: Apr. 29, 2014

(54) LINER FOR A TURBINE SECTION, A TURBINE SECTION, A GAS TURBINE ENGINE AND AN AEROPLANE PROVIDED THEREWITH

(75) Inventor: Arne Boman, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 922 days.

(21) Appl. No.: 12/518,101

(22) PCT Filed: Dec. 6, 2006

(86) PCT No.: PCT/SE2006/001389

§ 371 (c)(1),
(2), (4) Date: Jun. 23, 2010

(87) PCT Pub. No.: WO2008/069705

PCT Pub. Date: Jun. 12, 2008

(65) Prior Publication Data

US 2010/0278641 A1 Nov. 4, 2010

(51) Int. Cl.
*F01D 25/12* (2006.01)

(52) U.S. Cl.
USPC .......................................................... 415/177

(58) Field of Classification Search
USPC .............. 415/115, 116, 175, 176, 178, 170.1; 416/90 R, 95
See application file for complete search history.

(56) References Cited

U.S. PATENT DOCUMENTS

| 3,832,847 | A | * | 9/1974 | Butter et al. | 60/267 |
| 4,920,742 | A | * | 5/1990 | Nash et al. | 60/799 |
| 5,154,352 | A | | 10/1992 | Buckreus | |
| 5,899,060 | A | * | 5/1999 | Schmidt | 60/267 |
| 6,182,442 | B1 | | 2/2001 | Schmidt et al. | |
| 7,740,161 | B2 | * | 6/2010 | Boman | 228/101 |
| 2006/0213182 | A1 | | 9/2006 | Fint et al. | |

FOREIGN PATENT DOCUMENTS

| DE | 19505357 C1 | 5/1996 |
| DE | 19602731 C1 | 7/1997 |
| DE | 10350735 A1 | 6/2005 |
| WO | 03092946 A1 | 11/2003 |

OTHER PUBLICATIONS

European Search Report (May 3, 2012) for corresponding European App. EP 06 83 5822.
International Search Report for corresponding International Application PCT/SE2006/001389.
International Preliminary Report on Patentability for corresponding International Application PCT/SE2006/001389.

* cited by examiner

*Primary Examiner* — Richard Edgar
(74) *Attorney, Agent, or Firm* — WRB-IP LLP

(57) ABSTRACT

A liner for a turbine section includes a first wall, a plurality of webs interconnected with and projecting from the first wall, and a plurality of cooling channels, each of the cooling channels being delimited by two adjacent webs and the first wall, wherein each cooling channel presents a height corresponding to the height of its delimiting webs, and a width corresponding to the distance between its delimiting webs. At least one of the cooling channels has a width/height ratio of below 5 or/and the material of the webs has a higher thermal conductivity than the material of the first wall. A turbine section, a gas turbine engine and an aeroplane provided with such a liner are also disclosed.

29 Claims, 3 Drawing Sheets

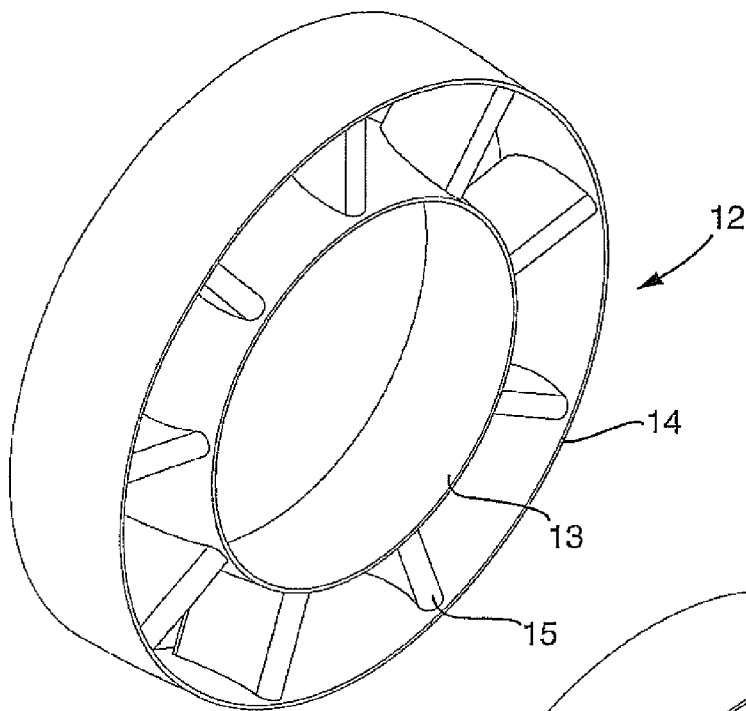
Fig 2
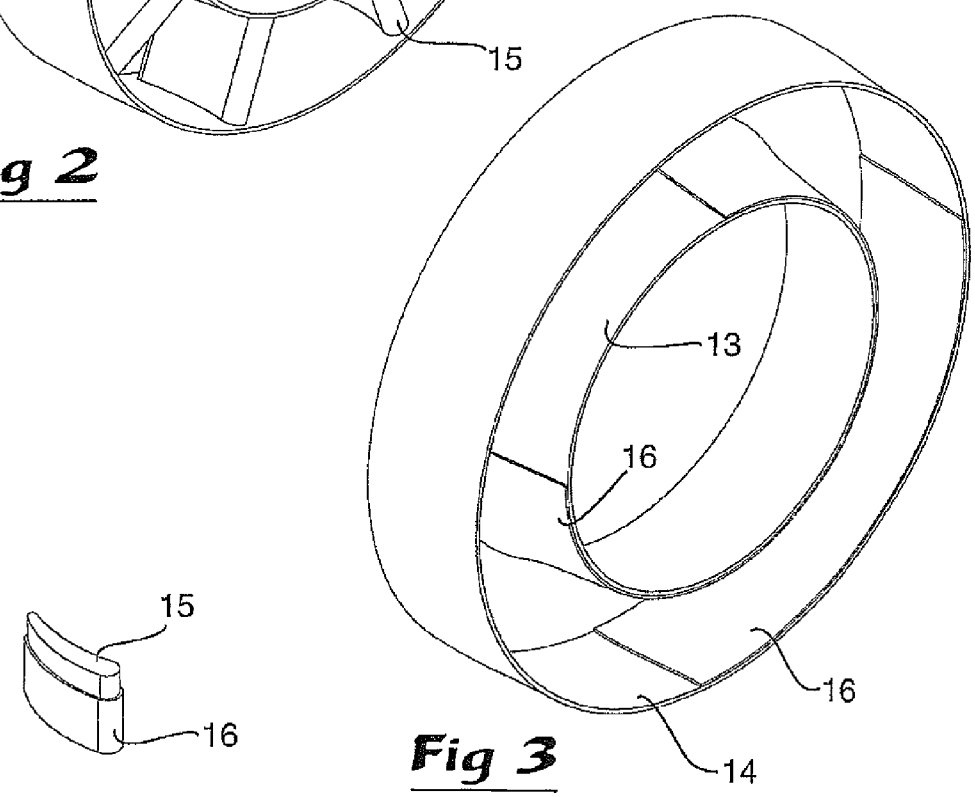
Fig 3
Fig 4

LINER FOR A TURBINE SECTION, A TURBINE SECTION, A GAS TURBINE ENGINE AND AN AEROPLANE PROVIDED THEREWITH

BACKGROUND AND SUMMARY

The present invention relates to a liner for a turbine section, said liner comprising a first wall, a plurality of webs interconnected with and projecting from said first wall, and a plurality of cooling channels, each of said cooling channels being delimited by two adjacent webs and said first wall, wherein each cooling channel presents a height corresponding to the height of its delimiting webs, and a width corresponding to the distance between its delimiting webs.

The invention also relates to a turbine section provided with the liner of the invention, a gas turbine engine provided with a turbine section according to the invention, and an aeroplane provided with a gas turbine engine according to the invention.

Preferably, the turbine section is a load-carrying frame arranged adjacent to at least one gas turbine, possibly but not necessarily located between two adjacent turbines, i.e. a high pressure turbine and a low pressure turbine. The load-carrying frame may be a so-called turbine centre frame, which may comprise an inner wall, an outer wall and a plurality of radial struts extending between said inner and outer walls. Said frame forms an annular channel, subdivided by said struts, through which the gases from an upstream combustion chamber passes, said gases thereby also passing the turbine or turbines of the engine. The liner according to the invention may comprise sheets or plates that are to be applied as a heat-protecting cover on the surface of any of said inner wall, outer wall and struts, said surface being a surface directed towards said annular channel.

Typically, the diameter of the gas turbine section of the invention will be in the range of one to two meters. However the invention may be applicable to corresponding gas turbine sections with dimensions outside said range.

A so called turbine centre frame of a turbine section of a gas turbine engine is often comprised by a load-Carrying part which is provided with sheets or plates that ensures the cooling thereof. These plates or sheets are not load-carrying, i.e. the load-carrying function and the cooling function are, mainly, divided on different parts of said section.

Normally, said plates or sheets comprise a first wall and a second wall divided and interconnected by longitudinal webs, said webs delimiting parallel channels between the first and second walls. The first wall is directed towards the channel through which hot gases are flowing through the turbine, while the second wall is directed towards the part to which the plate or sheet is attached.

A problem encountered by these plates is that their cooling ability is delimited due to inherent limitations of the structure thereof. Normally, cooling air is to be conducted through the channels of said plates, but there are limitations as to the amount of air that can be blown through the channels, and the pressure fall of the air in the channels also sets a limit to the cooling rate that may be achieved. Therefore, the plates become very hot, and, accordingly, they are conventionally made of a high temperature resistant material.

In order to lower the temperature of the plates, the heat flow through and out of the plates should be increased. Principally, there are only two possible ways accessible in order to achieve such a goal, namely either to improve the cooling, as for example achieved by means of the flow of cooling air, or to increase the heat conductibility of the plates.

Conventional solutions are based on the principle that cooling air drawn or blown through the channels of the plate are to absorb heat through convection from the wall adjacent to the hot combustion gases. However, since normally the delimitations of the engine do not permit a large flow of air of high velocity through the channels of the plates, it will not be easy to achieve the set target of lowering the wall temperature by increasing the cooling through the cooling medium in the channels.

It is desirable to present a liner as initially defined, the design of which is such that it presents an improved ability of conducting heat there through, such that, for a given temperature of the gases to which a first wall thereof is subjected during operation, the temperature of said first wall is decreased in relation to corresponding liners of prior art.

According to an aspect of the present invention, a liner is provided, characterised in that at least one of said cooling channels has a width/height ratio of below 5. The width/height ratio is markedly lower than what is common in prior art, as far as the applicant knows. By lowering said width/height ratio in relation to prior art, a larger proportion of the heat than before will be conducted to and through the webs, and a larger proportion of the heat than before will be transferred by means of convection from the webs to the cooling medium flowing through said channels during engine operation. Preferably, the liner comprises a plurality of parallel cooling channels, each delimited by two neighbouring webs, wherein a substantial part of said channels, preferably a majority thereof, and most preferably all of said channels present the width/height ratio. It is also preferred that both of the neighbouring webs that delimit said at least one cooling channel have substantially the same height. It is further preferred that at least the majority, and most preferably all of the webs present the same height, as measured in a direction perpendicularly from the surface of the first wall from which they project.

Preferably, the width/height ratio is below 3, even more preferably below 1, or, most preferably said ratio is below 0.5. It is also preferred that the width/height ratio is above 0.1.

Preferably, for said at least one channel, the ratio between the width of said at least one channel and the width of at least one of its delimiting webs is <2. Preferably, the width of said at least one channel and the width of each of its delimiting webs is <2. Among a plurality of parallel channels, these features are preferred for a substantial part thereof, preferably a major part thereof, and most preferably all of said channels.

According to a preferred embodiment, the width, or thickness, of each of said webs that delimit said at least one channel is below 2 mm. Preferably, among a plurality of such webs, a substantial part thereof, preferably a major part thereof, and most preferably all thereof present said width.

It is further preferred that the height of said at least one channel is above 2 mm., and preferably below 15 mm.

Preferably, the liner comprises a second wall interconnected with said first wall through at least some of said webs and located opposite to said first wall. Thereby, the liner present a number of separate cooling channels, each delimited by the first wall, the second wall and two neighbouring webs. Preferably, a substantial part of the webs, more preferably a major a part, and most preferably all of said webs interconnect said first and second walls, thereby being able to conduct heat from the first wall to the second wall, and also mechanically stabilising the liner.

The object of the invention is also achieved by means of the initially defined liner, characterised in that the material of the webs has a higher thermal conductivity than the material of the first wall. Thereby, a relatively larger proportion of heat than otherwise will be transferred through the webs, and, accordingly, a larger proportion of the heat will be transferred through convection from the webs to the cooling medium flowing through the channels of the liner. Preferably, such a design is combined with a liner design with the one or more of the features discussed herein.

According to a preferred embodiment, the material of the first wall has a higher temperature resistance than the material of the webs. Thereby, the ability of the liner to resist the immediate affection of hot gases flowing through turbine section in which the liner is positioned during operation may be provided for. The material of the webs can then be optimised with regard to other properties relevant for the function thereof, such as thermal conductivity.

Preferably, the material of the first wall comprises steel. Thereby, at least a layer of the first wall that is to be directly subjected and in contact with the hot gases flowing through the turbine section may, preferably, be made of steel, since the latter will provide acceptable mechanical as well as heat resistant properties.

Preferably, the material of the webs comprises copper or a copper alloy as a main constituent. Thereby an improved thermal conductivity of the webs is provided for.

According to an alternative embodiment, the material of the webs comprises a material the density of which is lower than that of the first wall. Since weight saving is an important issue in connection to the design of gas turbine engines to be used in vehicles, in particular aircrafts, a lighter material than that of the first wall might be preferred for the webs, especially since the number of webs and the total volume occupied thereby is likely to increase with a design in accordance with the invention.

According to a preferred embodiment the material of the webs comprises aluminium as a main constituent, due to an advantageous combination of light weight, high thermal conductivity, machinability, and availability of the latter. Depending on the cooling air conditions, aluminium alloys may be used in order to secure high temperature material properties while maintaining a higher conductivity and lower density than steel materials.

A mixture of copper and aluminium may be used, i.e. copper in the webs and aluminium in the outer wall or a part of the outer wall, i.e. the wall which is not facing the hot gases. In order to facilitate the use of aluminium, a thermal barrier coating (TBC coating) may be applied to the hot gas side.

The invention also includes a turbine section, characterised in that it comprises a liner according to the invention. Preferably, the liner is attached to a load-carrying part of said turbine section, whereby said part may be any of a radial strut connecting an inner wall and an outer wall of said turbine section, an inner wall of the turbine section, or an outer wall of the turbine section. Preferably, the first wall of the liner is turned towards the turbine chamber, such that it will be subjected to hot gases flowing therein during turbine operation.

Preferably, the turbine section comprises a load-carrying frame arranged adjacent to at least one gas turbine, normally a frame located between a low pressure turbine and a high pressure turbine as seen in the gas flow direction through the engine.

Further features and advantages of the present invention will be presented in the following detailed description.

BRIEF DESCRIPTION OF THE DRAWINGS

FIG. 2 is a perspective view showing a turbine section to be provided with a liner according to the invention, FIG. 3 shows a part of the turbine section of FIG. 2, provided with a liner according to the invention, FIG. 4 is a partly cut part of a turbine section provided with a liner according to the invention.

DETAILED DESCRIPTION

Figure 1:
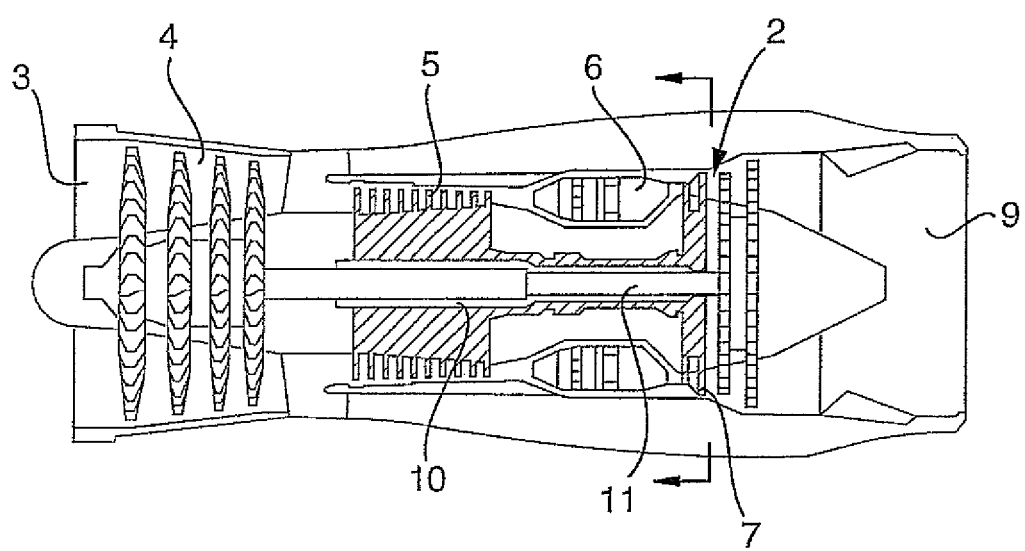
FIG. 1 is a schematic representation of a first embodiment of a gas turbine engine provided with a liner according to the invention.

FIG. 1 is an oversight view of a gas turbine engine 1 according to the invention provided with a turbine section 2 provided with a liner according to the invention. The gas turbine engine 1 shown in FIG. 1 is of conventional construction and comprises, in axial flow series, an air intake 3, low pressure compressor 4, high pressure compressor 5, combustion equipment 6, high pressure turbine 7, low pressure turbine 8 and an exhaust outlet 9. During operation, the high pressure compressor is driven by the high pressure turbine via a first hollow shaft 10. Similarly, the low pressure compressor 5 is driven by the low pressure turbine via a second hollow shaft 11 which is coaxially disposed within the first hollow shaft 10.

The gas turbine engine 1 operates in the conventional manner whereby air drawn in through the air intake 3 is compressed by the low pressure compressor 4 before passing into the high pressure compressor 5 where it is compressed further. The compressed air then flows into the combustion equipment 6 where it is mixed with fuel and the mixture combusted. The resultant hot combustion products then expand through the high and low pressure turbines 7, 8 before being exhausted to the atmosphere through the exhaust nozzle 9.

The turbine section 2 to be provided with a liner according to the invention is a load-carrying frame 12 (see FIG. 2) arranged in a part of the turbine housing in which the gases flowing from the combustion chamber still have such a high temperature that the material of the load-carrying frame 12 has to be protected from the heat by means of a protective liner. The turbine section 2 is arranged downstream the combustion chamber as seen in the gas flow direction the gas turbine engine. The load-carrying frame 12 forms part of the stator of the engine. As in this embodiment, the load-carrying frame 12 provided with the liner according to the invention is located downstream and adjacent the high pressure turbine 7.

FIG. 2 shows the load-carrying frame 12 more in detail. It comprises an inner wall 13, an outer wall 14 and struts 15 extending between the inner wall 13 and the outer wall 14. The inner wall 13 and the outer wall 14 delimits an annular channel which is subdivided by the struts 15 into segments and through which the still hot gases from the combustion chamber pass during engine operation. Thereby, said walls 13, 14 and struts 15 are subjected to a significant heat.

In order to decrease the heat to which the load-carrying parts 13, 14, 15 of the frame 12 are subjected, a liner 16 according to the invention is attached to said parts 13, 14, 15 (see FIGS. 3 and 4). The liner 16 comprises plates or the like, a periphery of which matches the periphery of the load carrying part onto which they are to be attached. A plurality of plates may be attached to said parts and interconnected in order to form the liner 16. Preferably, there is provided a gap between the liner 16 and the load carrying part 13, 14, 15 which it covers. However, the arrangement of the liner 16 onto said parts 13, 14, 15 may be of a kind known per se, and will therefore not be discussed more in detail in this context.

FIG. 4 shows one of the struts 15, and indicates how the strut 15 is provided with said liner 16. The liner 16 covers the exterior of the strut 15, thereby protecting it from the heat of hot gases flowing through the engine during engine operation.

Figure 5:
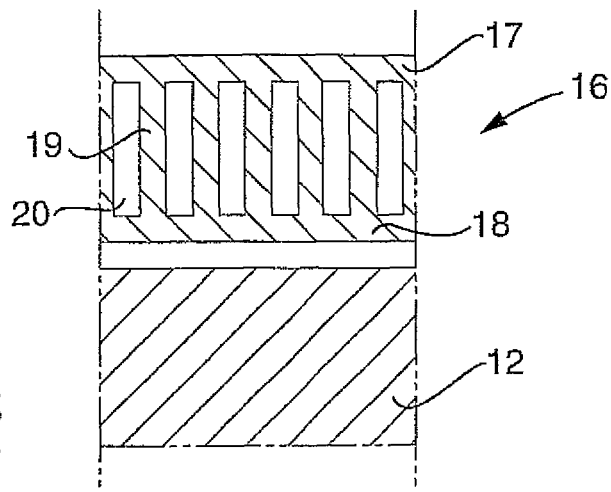
FIG. 5 is a cross-sectional view of a liner of the invention, according to a first embodiment as arranged adjacent to a load carrying part of a turbine section.
Figure 6:
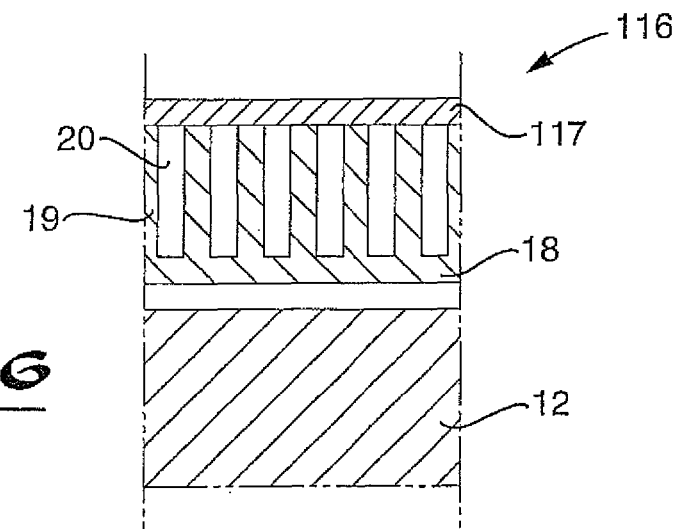
FIG. 6 is a cross-sectional view of a liner of the invention, according to a second embodiment, as arranged adjacent to a load carrying part of a turbine section.

FIGS. 5 and 6 show the design of the liner 16 more in detail. The liner 16 comprises a first wall 17, a second wall 18 and a plurality of webs 19 connecting and separating the first and second walls 17, 18. Channels 20 extending in parallel are delimited by said walls 17, 18 and webs 19. FIGS. 5 and 6 show the liner 16 as attached to the inner wall 13 of the frame 12. However, it should be understood that a corresponding provision of the liner 16 on the outer wall 14 and the struts 15 is also included in the invention.

The first wall 17 of the liner 16 is directed towards, and subjected to direct contact with the hot gases flowing through the turbine section 2 during engine operation. The second wall 18, on the other hand, is turned towards the load-carrying part 13, 14, 15 to which the liner 16 is attached or which is covered by the liner 16. Preferably, the longitudinal direction of the channels 20 of the liner 16 attached to the inner wall 13 and the outer wall 14 of the frame 12 generally coincides with the longitudinal direction of said walls 13, 14, i.e. the longitudinal direction of the engine 1 and the gas flow direction through the latter. The longitudinal direction of the channels 20 of the liner 16 attached to the struts 15 may, however coincide with the longitudinal direction of said struts 15, i.e. from the inner wall 13 to the outer wall 14, i.e. crosswise to the gas flow direction through the engine 1.

Moreover, there should be provided means (not shown) for introducing a flow of a cooling medium into said channels 20, and means for letting said cooling medium out of the channels 20. Such means may include any kind of compressor, a manifold via which the cooling medium is introduced into the channels 20 of the liner 16, and a conduit through which the cooling medium is guided from the compressor to said manifold. Preferably, the inlets to the channels 20 are closed towards the hot gases flowing through the turbine section 2 that comprises said frame 12. However, the outlets of the channels 20 might communicate with the turbine chamber in which the hot gases are to flow during engine operation, thereby possibly providing for a film cooling effect on the turbine wall downstream the section 2 provided with said liner 16. Alternatively, there might be provided subsequent liner segments in the longitudinal direction of the engine 1, whereby cooling air from the outlet of an upstream segment is permitted to enter the turbine chamber and provide for film cooling of a subsequent downstream liner segment.

The cooling channels 20 has a width/height ratio of below 1, preferably below 0.75, and most preferably below 0.5. In this context, the width is referred to as the dimension thereof in a direction generally parallel with the plane of the first and second walls 17, 18, while the height is referred to as the dimension thereof in a direction perpendicular to said plane or planes. However, it should be understood that the first and second walls 17, 18 are not likely to be absolutely flat or plane, but will, in most cases, present a certain curvature, following the curvature of the load-carrying part 13, 14, 15 to which the liner 16 is attached or which is covered thereby. In other words, the plane in relation to which the height direction may be the normal may present a curvature.

In the embodiment shown in FIG. 5, the material of the first wall 17, the second wall 18 and the webs is the same, preferably high temperature steel material such as haynes188 or Haynes 230.

In the embodiment shown in FIG. 6, on the other hand, the material of the first wall 117 or at least of a part thereof that is directly subjected to flow of hot gases through the turbine section 2, differs from the material of the webs 19 connected thereto. Preferably, the material of the first wall 117 has a higher temperature resistance than the material of the webs 19, while, on the other hand, the material of the webs 19 has a higher thermal conductivity than the material of the first wall 117. By using a material of higher thermal conductivity in the webs 19, the webs 19 may contribute to the overall conduction of heat to a higher degree than before. The suggested design will permit an improved conduction of heat through the webs 19, from which a part of the heat may be transferred to the cooling medium by means of convection and a part of the heat may be transferred the second wall 18. Since a larger amount of the heat may now be transferred to the cooling medium via the high-conductive webs 19, a lower amount of heat than earlier will now be transferred to the second wall 18 through said webs 19. Since less heat than otherwise is transferred from the second wall 18 to the load-carrying part 13, 14, 15 of the frame 12 to which the liner 116 is attached, said load-carrying part 13, 14, 15 of the frame 12 will be less subjected to heat and, accordingly, better able to fulfil its load-carrying task, thanks to a lower temperature.

Preferably, the material of the first wall 117 or said part thereof comprises steel as its main constituent, while the material of the webs 19 comprises copper as its main constituent. However, other combinations of materials of the first wall 117 and the webs 19 might as well be conceived and be within the scope of the invention. Preferably, the material of the second wall 18 is the same as that of the webs 19.

If the plate not is flat, it is an advantage to have a large copper content in the plate. since copper is easier to shape with forming methods than the high temperature steels commonly used. Shaping is possibly needed to make the plate follow a not plane load carrying structure.

The cooling channels 20 may be provided by wire-electro discharge machining the channels out of a solid sheet forming the second wall 18, thereby also resulting in the provision of the webs 20. In case a part of or the whole first wall 17, 117 is made of the same material as the second wall 18 and the webs 19, also the first wall 17, 117 or part of it could be part of that one and the same sheet in which the channels 20 are formed by means of wire-electro discharge machining. Wire-electro discharge machining is a preferred solution compared to pin milling or disc milling for very narrow slots.

Figure 7:
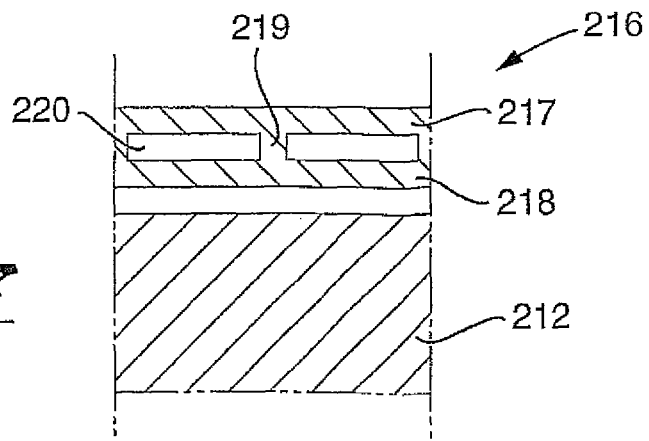
FIG. 7 is a cross-sectional view of a liner according to prior art, as arranged adjacent to a load carrying part of a turbine section.

FIG. 7 shows a liner 216 according to prior art, in which the width/height ratio of the channels 220, as seen in a cross section of the liner, is 8.3 or more. The liner 216 is provided close to a load-carrying frame 212, and comprises a first wall 217, a second wall 218 and webs 219 that interconnect aid first and second walls 217, 218, thereby defining said channels 220.

It should be understood that the above description of preferred embodiments has been made in order exemplify the invention, and that alternative solutions will be obvious for a person skilled in the art, however without departing from the scope of the invention as defined in the appended claims supported by the description and the drawings.

For example, the liner 16, 116 according to the invention may be covering only parts of the load-carrying frame 12, while other parts are covered by a conventional liner, for example like the one shown in FIG. 7. Moreover, the materials of the parts of the load-carrying frame 12 as well as the liner 16, 116 may be other than those suggested herein. Likewise, the arrangement of the liner 16, including its fixing and the distance thereof to the adjacent load-carrying frame, will be a design issue for every individual application and may, therefore, differ from construction to construction.

The invention claimed is:

1. A liner for a turbine section, the liner comprising a first wall, a plurality of webs interconnected with and projecting from the first wall, and a plurality of A liner for a turbine section, the liner comprising a first wall, a plurality of webs interconnected with and projecting from the first wall, and a plurality of cooling channels for air cooling of the liner, each of the cooling channels being delimited by two adjacent webs and the first wall, wherein the material of the webs has a higher thermal conductivity than the material of the first wall, an exterior surface of the liner for facing the turbine section to be lined being continuous and uninterrupted, each of the cooling channels being delimited by two adjacent webs and the first wall, wherein each cooling, channel presents a height corresponding to the height of its delimiting webs, and a width corresponding to the distance between its delimiting webs, wherein at least one of the cooling channels has a width/height ratio of below 5, wherein the material of the webs has a higher thermal conductivity than the material of the first wall, and an exterior surface of the liner for facing the turbine section to be lined is continuous and uninterrupted.

2. A liner according to claim 1, wherein the width/height ratio is below 3.

3. A liner according to claim 1, wherein the width/height ratio is below 1.

4. A liner according to claim 1, wherein the width/height ratio is below 0.5.

5. A liner according to claim 1, wherein the width/height ratio is above 0.1.

6. A liner according to claim 1, wherein, for the at least one channel, the ratio between the width of the at least one channel and the width of at least one of its delimiting webs is <2.

7. A liner according to claim 1, wherein the width of each of the webs that delimit the at least one channel is below 2 mm.

8. A liner according to claim 1, wherein the height of the at least one channel is above 2 mm.

9. A liner according to claim 1, wherein the height of the at least one channel is below 15 mm.

10. A liner according to claim 1, comprising a second wall interconnected with the first wall through at least some of the webs and located opposite to the first wall, the exterior surface of the liner being a surface of the second wall and being continuous and uninterrupted.

11. A liner according to claim 1, wherein the material of the first wall has a higher temperature resistance than the material of the webs.

12. A liner according to claim 1, wherein the material of the first wall comprises steel.

13. A liner according to claim 1, wherein the material of the webs comprises copper as a main constituent.

14. A liner for a turbine section, the liner comprising a first wall, a plurality of webs interconnected with and projecting from the first wall, and a plurality of cooling channels for air cooling of the liner, each of the cooling channels being delimited by two adjacent webs and the first wall, wherein the material of the webs has a higher thermal conductivity than the material of the first wall, an exterior surface of the liner for facing the turbine section to be lined being continuous and uninterrupted.

15. A liner according to claim 14, wherein the material of the first wall has a higher temperature resistance than the material of the webs.

16. A liner according to claim 14, wherein the material of the first wall comprises steel.

17. A liner according to claim 14, wherein the material of the webs comprises copper as a main constituent.

18. A liner according to claim 14, wherein it comprises a second wall interconnected with the first wall through at least some of the webs and located opposite to the first wall.

19. A liner according to claim 14, comprising a second wall interconnected with the first wall through at least some of the webs and located opposite to the first wall, the exterior surface of the liner being part of the second wall and being continuous and uninterrupted.

20. A turbine section, comprising a liner, the liner comprising a first wall, a plurality of webs interconnected with and projecting from the first wall, and a plurality of cooling channels for air cooling of the liner, each of the cooling channels being delimited by two adjacent webs and the first wall, wherein the material of the webs has a higher thermal conductivity than the material of the first wall, an exterior surface of the liner for facing the turbine section to be lined being continuous and uninterrupted.

21. A turbine section according to claim 20, wherein the first wall of the liner is directed such that it will be directly subjected to hot gases flowing through the turbine section during turbine operation.

22. A turbine section according to claim 20, wherein the liner is attached to a load-carrying part of the turbine section.

23. A turbine section according to claim 22, wherein the load-carrying part of the turbine section comprises a radial strut connecting an inner wall and an outer wall of the turbine section.

24. A turbine section according to claim 22, wherein the load-carrying part of the turbine section comprises an inner wall of the turbine section.

25. A turbine section according to claim 22, wherein the load-carrying part of the turbine section comprises an outer wall of the turbine section.

26. A turbine section according to claim 20, wherein the turbine section comprises a load-carrying frame arranged adjacent to at least one gas turbine.

27. A turbine section according to claim 20, wherein the turbine section comprises means for introducing a flow of a cooling medium into the channels, and means for letting the cooling medium out of the channels.

28. A gas turbine engine, comprising a turbine section, the turbine section comprising a liner, the liner comprising a first wall, a plurality of webs interconnected with and projecting from the first wall, and a plurality of cooling channels for air cooling of the liner, each of the cooling channels being delimited by two adjacent webs and the first wall, wherein the material of the webs has a higher thermal conductivity than the material of the first wall, an exterior surface of the liner for facing the turbine section to be lined being continuous and uninterrupted.

29. An aeroplane, comprising a gas turbine engine, the gas turbine engine comprising a turbine section, the turbine section comprising a liner, the liner comprising a first wall, a plurality of webs interconnected with and projecting from the first wall, and a plurality of cooling channels for air cooling of the liner, each of the cooling channels being delimited by two adjacent webs and the first wall, wherein the material of the webs has a higher thermal conductivity than the material of the first wall, an exterior surface of the liner for facing the turbine section to be lined being continuous and uninterrupted.

* * * * *